United States Patent
Shaw

(10) Patent No.: US 7,401,865 B2
(45) Date of Patent: Jul. 22, 2008

(54) TORSION PEDAL FEEL EMULATOR

(75) Inventor: Schuyler S. Shaw, Dayton, OH (US)

(73) Assignee: Delphi Technologies, Inc., Troy, MI (US)

( * ) Notice: Subject to any disclaimer, the term of this patent is extended or adjusted under 35 U.S.C. 154(b) by 1225 days.

(21) Appl. No.: 10/387,013

(22) Filed: Mar. 12, 2003

(65) Prior Publication Data

US 2004/0178672 A1 Sep. 16, 2004

(51) Int. Cl.
*B60T 13/74* (2006.01)
(52) U.S. Cl. .............................. 303/3; 74/512
(58) Field of Classification Search .................. 74/560, 74/512 X, 513, 516, 518, 512; 303/3, 155; 267/25, 277, 279, 284
See application file for complete search history.

(56) References Cited

U.S. PATENT DOCUMENTS

| 3,733,922 | A | * | 5/1973 | Tripp | 74/523 |
| 4,300,409 | A | * | 11/1981 | Leighton | 74/512 |
| 5,729,979 | A | | 3/1998 | Shaw et al. | |
| 6,019,016 | A | * | 2/2000 | Takagi et al. | 74/513 |
| 6,186,026 | B1 | * | 2/2001 | Shaw et al. | 74/512 |
| 6,367,886 | B1 | | 4/2002 | Shaw | |
| 6,464,306 | B2 | | 10/2002 | Shaw et al. | |
| 6,591,710 | B1 | | 7/2003 | Shaw | |

FOREIGN PATENT DOCUMENTS

JP 2000142338 A * 5/2000

* cited by examiner

*Primary Examiner*—Xuan Lan Nguyen
(74) *Attorney, Agent, or Firm*—Scott A. McBain

(57) ABSTRACT

A torsion pedal feel emulator assembly for a motor vehicle and a method of operating the same. The assembly includes a pedal member for receiving an applied pedal force. A torsion member is operably attached to the pedal member. A portion of the torsion member is positioned adjacent a reaction surface. The torsion member rotates as a result of the applied pedal force, and a dynamic reaction force is generated against the applied pedal force. A pivot is operably attached to the torsion member and the motor vehicle. The method includes receiving an applied pedal force. A torsion member is rotated as a result of the applied pedal force. A dynamic reaction force is generated against the applied pedal force as a result of the torsion member rotation.

18 Claims, 3 Drawing Sheets

TORSION PEDAL FEEL EMULATOR

This invention was made in the performance of a Cooperative Research and Development Agreement with the Department of the Air Force. The Government of the United States has certain rights to use the invention.

TECHNICAL FIELD OF THE INVENTION

The present invention relates generally to vehicular pedal assemblies. More particularly, the invention relates to a torsion pedal feel emulator assembly and method.

BACKGROUND OF THE INVENTION

Conventional vacuum boosted brake apply systems utilize a direct application of pedal-to-brake force via hydraulic fluid. Drivers have become accustomed to the pedal response or "feel" generated by such systems. With brake-by-wire (BBW) or similar type of vehicle braking system, however, the application of braking force to the wheel brakes is generated by an electric or an electro-hydraulic controlled means. This changes the BBW pedal feel characteristics at the vehicle's brake pedal from those conventional apply systems and prevents the driver from experiencing the customary brake pedal feel. Therefore, strategies have been developed for emulating pedal feel that drivers are accustomed.

Known BBW systems that generate a pedal feel consistent with that of conventional vacuum boosted apply systems may utilize a master cylinder assembly to emulate pedal feel. The brake pedal feel is typically transparent to the driver when compared to the conventional vacuum boosted apply systems. Examples of such emulators include U.S. Pat. Nos. 5,729,979 and 6,367,886 to Shaw. Such brake pedal emulators may include (sequentially compressible) springs or other biasing members and restrictive fluid flow paths to generate non-linear reaction force versus pedal travel (e.g., movement of the pedal) consistent with conventional apply systems. These emulator elements are typically carried within the master cylinder assembly.

Although such assemblies may provide adequate brake pedal travel and feel characteristics, use of a master cylinder including emulator elements adds to the cost and size of the brake pedal assembly. As such, it would be desirable to provide a non-linear reaction force to pedal travel assembly and method that do not require a master cylinder or like mechanisms to generate pedal feel consistent with vacuum boosted brake apply systems.

Unlike the non-linear reaction force versus travel output of brake pedals, the accelerator, clutch, and emergency brake pedals typically exhibit a linear response that is much simpler mechanically to provide. Nevertheless, the use of spring(s) or like biasing elements to generate the pedal feel may add to the cost of the pedal assembly. As such, it would be desirable to provide a linear reaction force to pedal travel assembly and method without the need for external springs or like elements to generate the desired pedal feel.

Therefore, it would be desirable to provide a pedal feel emulator assembly and method that overcomes the aforementioned and other disadvantages.

SUMMARY OF THE INVENTION

One aspect of the present invention provides a torsion pedal feel emulator assembly for a motor vehicle. The assembly includes a pedal member for receiving an applied pedal force. A torsion member is operably attached to the pedal member. A portion of the torsion member is positioned adjacent a reaction surface. The torsion member rotates as a result of applied pedal force, and a dynamic reaction force is generated against the applied pedal force. A pivot is operably attached to the torsion member and the motor vehicle.

Another aspect of the invention provides a method of operating a pedal feel emulator assembly for a motor vehicle. The method includes receiving an applied pedal force. A torsion member is rotated as a result of the applied pedal force. A dynamic reaction force is generated against the applied pedal force as a result of the torsion member rotation.

Another aspect of the present invention provides a torsion pedal feel emulator assembly for a motor vehicle. The assembly includes means for receiving an applied pedal force and means for rotating a torsion member as a result of the applied pedal force. The assembly further includes means for generating a dynamic reaction force against the applied pedal force as a result of the torsion member rotation.

The foregoing and other features and advantages of the invention will become further apparent from the following detailed description of the presently preferred embodiments, read in conjunction with the accompanying drawings. The detailed description and drawings are merely illustrative of the invention, rather than limiting the scope of the invention being defined by the appended claims and equivalents thereof.

DESCRIPTION OF THE PRESENTLY PREFERRED EMBODIMENTS

Figure 1:
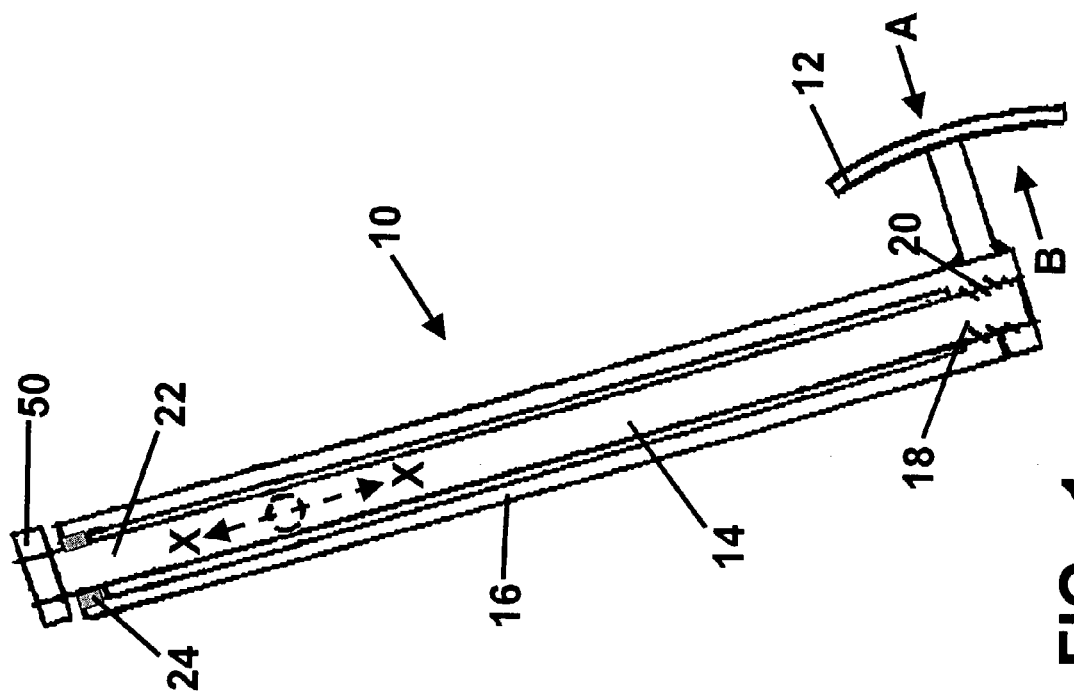
FIG. 1 is a "side" perspective view of a pedal feel emulator assembly for a motor vehicle in accordance with the present invention.

Referring to the drawings, wherein like reference numerals refer to like elements, FIG. 1 is a "side" perspective view of a pedal emulator assembly, shown generally by numeral 10, for a motor vehicle in accordance with the present invention. Assembly 10 includes a pedal member, in this case a brake pedal pad 12, for receiving an applied pedal force (shown by arrow A) and a torsion member, in this case a torsion bar 14, operably attached to the pedal pad 12. Torsion bar 14 may be manufactured from a resilient material to allow one end to be turned about an axis X while the other end is held fast. The resilient material preferably resists wear and allows the torsion bar 14 to be repeatedly twisted and un-twisted with numerous pedal force A application cycles. Examples of suitable resilient materials include, but are not limited to, plastic, rubber, acrylic, silicone, vinyl, urethane, steel, metal, metal alloy, and combinations thereof.

A portion of the torsion bar 14 may be positioned coaxially within a torsion member housing 16. A first end 18 of the torsion bar 14 may be attached to the housing 16 by, for example, a plurality of welds 20. A second end 22 of the torsion bar 14 may extend outside of the housing 16 through a bearing 24. Bearing 24 may be an annular ball-bearing or a bushing operably attached to the housing 16 to facilitate rotation of the second end 22 with respect to the housing 16.

Figure 2:
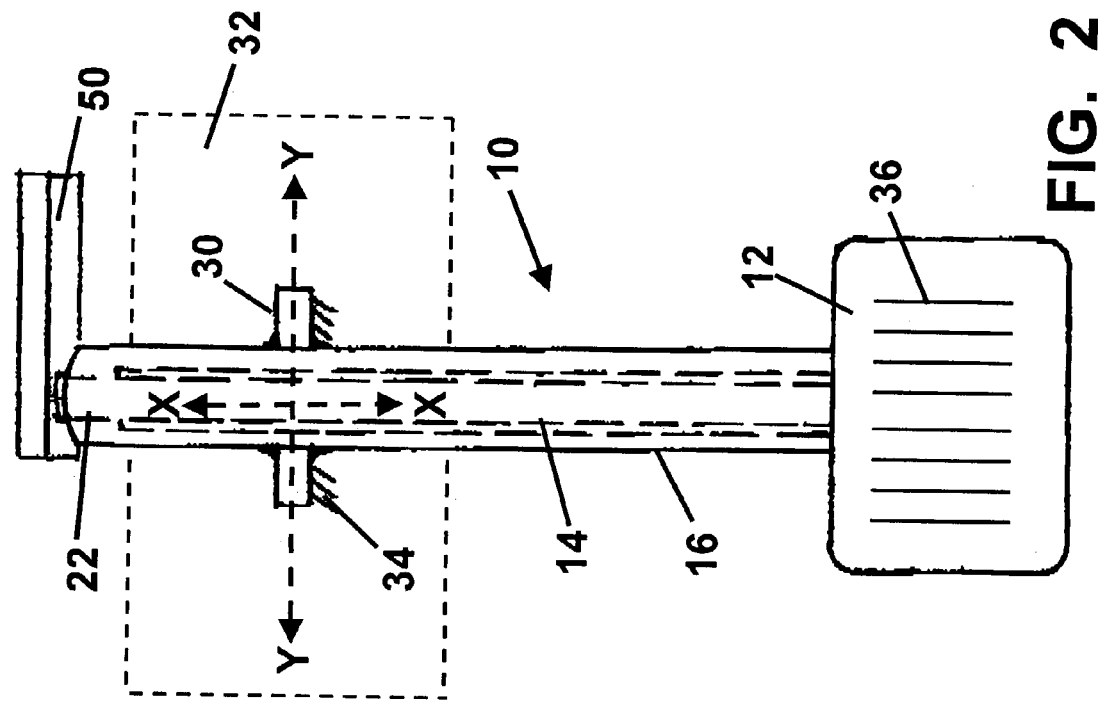
FIG. 2 is a "front" perspective view of the pedal feel emulator assembly shown in FIG. 1 and shown mounted on a vehicle floor in accordance with the present invention.

As shown in a "front" perspective view of FIG. 2, a pivot 30 may be operably attached to the housing 16 and the motor vehicle, in this case mounted to a vehicle floor 32. Pivot 30 may be welded to the vehicle floor 32 with one or more welds 34 and may include a bolt positioned therethrough or other fastening means to allow an arcuate pedal range of motion about an axis Y as the pedal force A is applied. The mounting position of the assembly 10 relative to the vehicle floor 32 may vary for each vehicle and is typically adjusted for ergonomic driver operation. A plurality of ridges 36 may be formed on the pedal pad 12 surface to provide increased friction with the driver foot. Pedal pad 12 may be conventionally shaped conforming to a driver foot as is common in the art.

Figure 3:
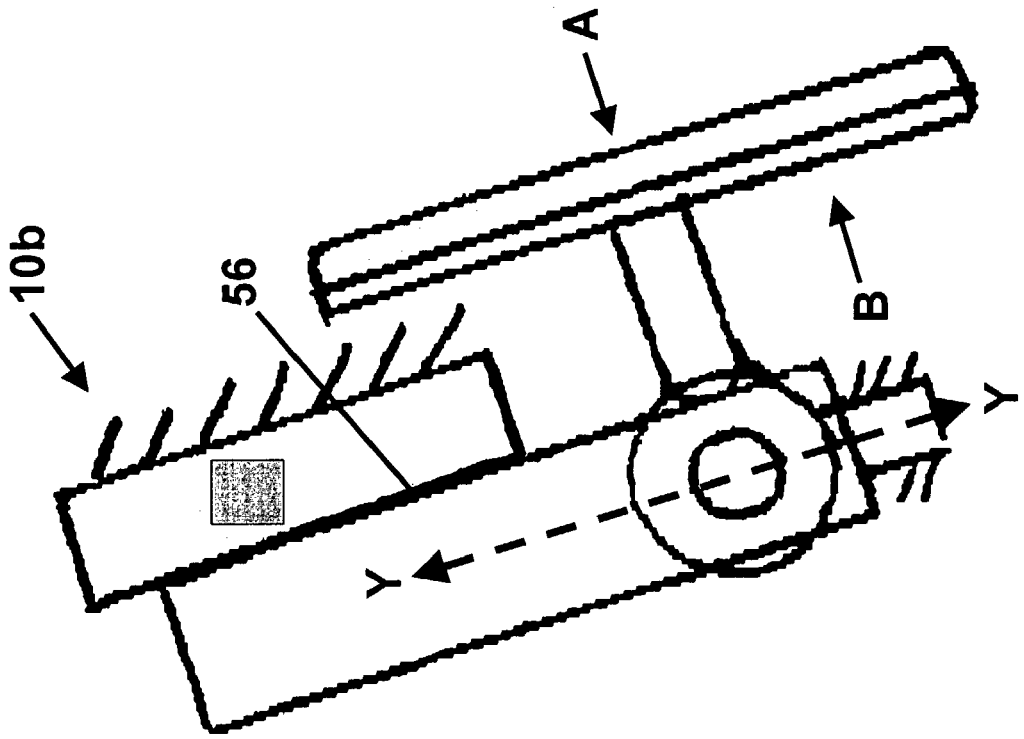
FIG. 3 is a "top" perspective view of the pedal feel emulator assembly shown in FIG. 1.

As shown in a "top" perspective view of FIG. 3, a torque arm 50 may be operably attached to the torsion bar 14 and positioned adjacent a reaction surface 52, which is typically attached to the vehicle (e.g., underneath the dashboard). One or more, in this case one, sensor 54 may operably attached to the assembly 10 for estimating the applied pedal force A. In one embodiment of the present invention, the sensor 54 may be a fiber optic-type transducer known in the art that optically estimates the applied pedal force A as a function of the torque arm 50 rotation. In another embodiment, the sensor 54 may be a strain gauge type sensor known in the art for estimating the applied pedal force A as a function of rotational strain in the torsion bar 14. In yet another embodiment, the sensor 54 may estimate the applied pedal force A as a function of the pedal pad 12 movement. Those skilled in the art will recognize that any number, variety, or combination of sensor(s) may be operably attached or associated with the assembly 10 for estimating the applied pedal force A.

Those skilled in the art will recognize that the pedal feel emulator assembly may include numerous variations in design and material constitution. In another embodiment, the assembly may be an accelerator pedal feel assembly, a clutch pedal feel assembly, a parking brake pedal feel assembly, and/or other pedal feel assemblies for controlling various vehicle function(s). Furthermore, the assembly components may be manufactured from numerous types of materials, as a single unit, as shown, or as multiple-part units.

During operation of the pedal feel emulator assembly 10, the applied pedal force A is received by the pedal pad 12 causing the torsion bar 14 to pivot through a range of motion about axis Y, referred to herein as "pedal travel". The pedal force A may be a brake pedal force, an accelerator pedal force, a clutch pedal force, a parking brake pedal force, and the like, depending on the type of the assembly 10. As the pedal force A is applied, the torque arm 50 is biased against the reaction surface 52 thereby causing the torque arm 50 and attached torsion bar 14 to rotate about an axis X. Specifically, the torsion bar 14 rotates at the second end 22, which is attached to the torque arm 50. The torsion bar 14 first end 18 is attached to the housing 16 and therefore is not able to rotate. The applied pedal force A and resulting rotation of the first end 18 with respect to the second end 22 produces rotational strain within the torsion bar 14 resilient material. The rotational strain of the torsion bar 14 provides a spring force that generates a dynamic reaction force B against the applied pedal force A.

The applied pedal force A results in rotation of the torsion bar 14 second end 22 and movement of the torque arm 50 (e.g., as shown in FIG. 3, dashed lines) with respect to the reaction surface 52. The applied pedal force A may be proportional to the rotation and strain of the torsion bar 14 and movement of the torque arm 50. Accordingly, the applied pedal force A may be estimated by the sensor 54 by measuring the torsion bar 14 rotation/strain, torque arm 50 movement, and/or pedal pad 12 movement. As the applied pedal force A increases, the opposing dynamic reaction force B increases due to the mounting strain in the torsion bar 14. The rate at which the dynamic reaction force B increases determines a characteristic pedal feel, which typically varies from one assembly pedal type to another assembly pedal type.

Figure 4:
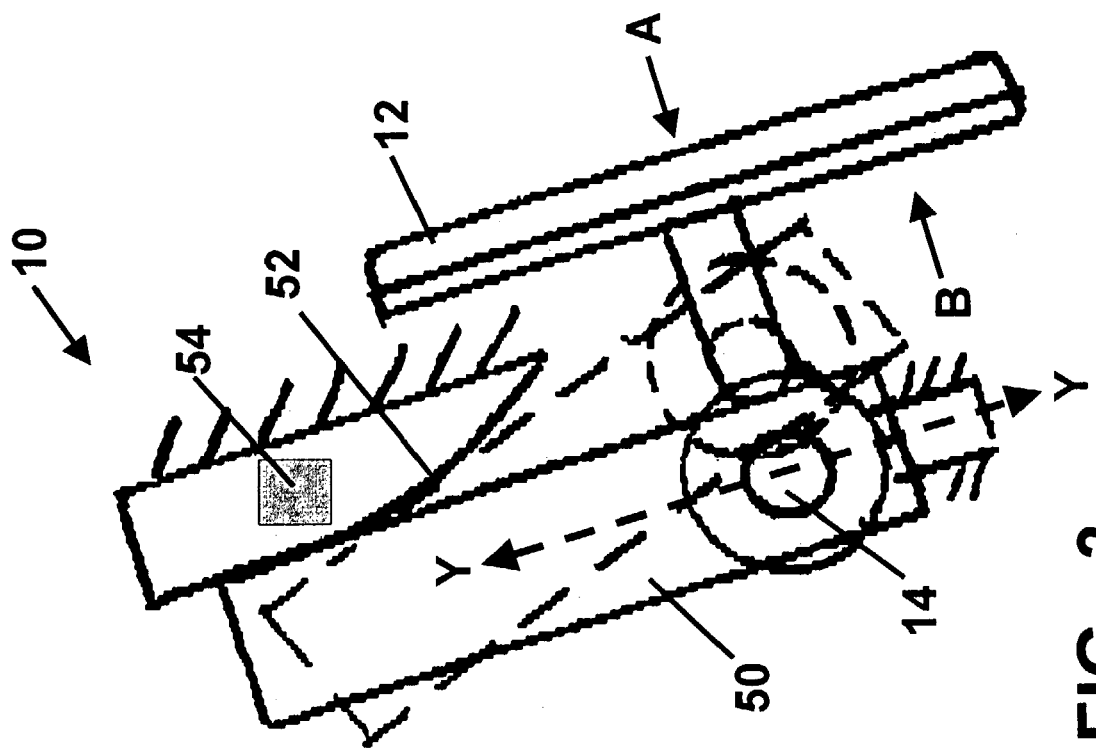
FIG. 4 is a "top" perspective view of an alternative embodiment of a pedal feel emulator assembly for a motor vehicle in accordance with the present invention.

The rate at which the dynamic reaction force B increases and thus the characteristic pedal feel may be determined by the geometry of the reaction surface 52. In one embodiment, a non-linear reaction surface 24 comprised of one or more curves, for example, may be used to generate a non-linear reaction force to pedal travel characteristic, which is usually associated with brake-type pedals. In this case, the rate at which the torsion bar 14 rotates may increase with applied pedal force A thereby resulting in an exponential increase in the dynamic reaction force B. In another embodiment of a pedal feel emulator assembly 10b, as shown in FIG. 4, a linear reaction surface 56 may be used to generate a linear reaction force to pedal travel characteristic, which is usually associated with accelerator-, clutch-, and parking brake-type pedals. In this case, the rate at which the torsion bar rotates may be constant with applied pedal forces A thereby resulting in a nominal increase in the dynamic reaction force B.

Regardless of the geometry of the reaction surface 52, 56 and type of reaction force to pedal travel characteristic generated, the assembly 10, 10b of the present invention may generate the described pedal feel without the need for a master cylinder, external springs, or other mechanical devices. The absence of such parts may reduce unit cost and size, increase reliability (i.e., less moving parts), and simplify the manufacture process.

Figure 5:
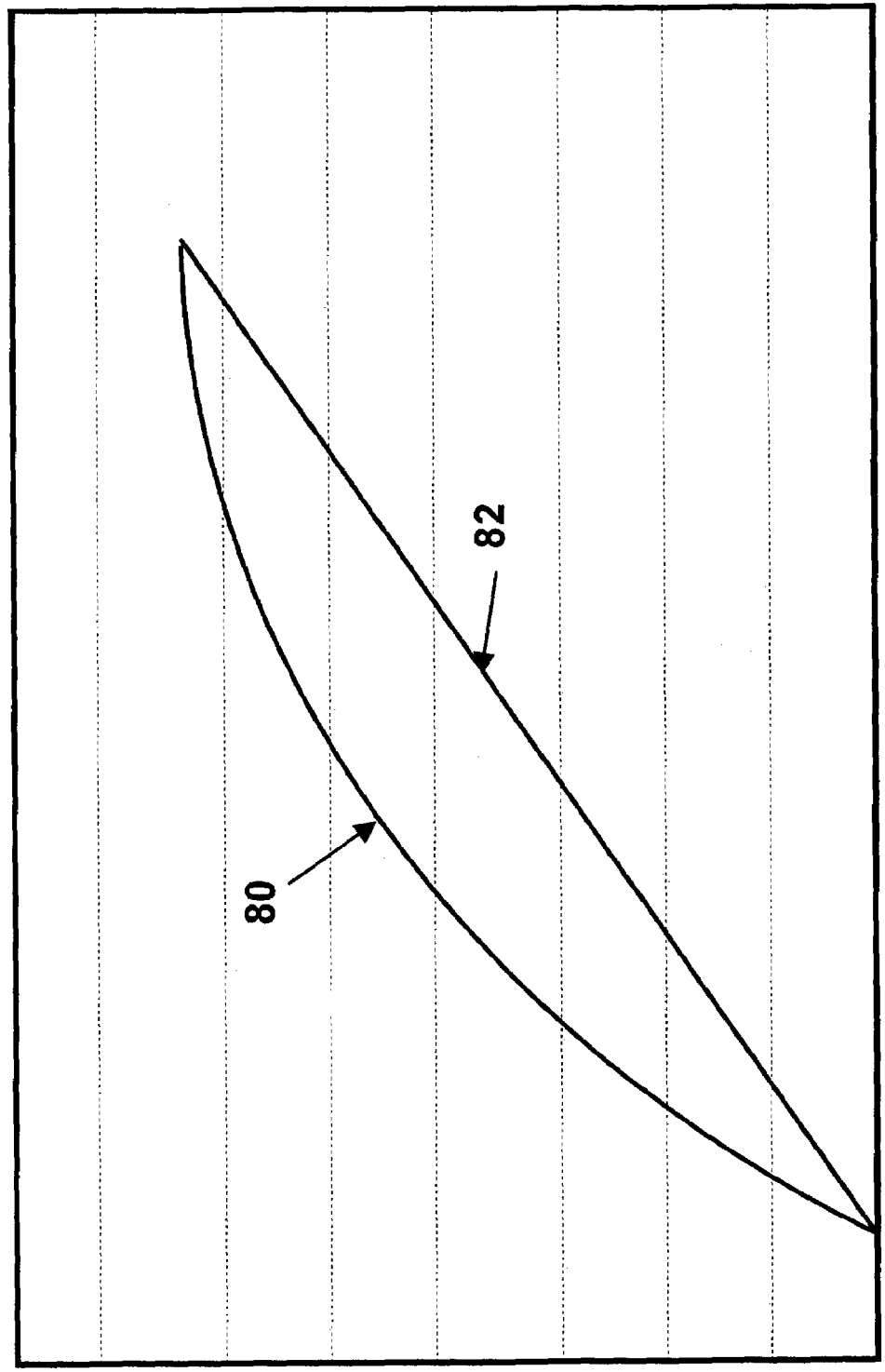
FIG. 5 is a graph of reaction force versus pedal travel for a brake pedal and an accelerator pedal, in accordance with the present invention.

FIG. 5 is a graph of reaction force versus pedal travel for a brake pedal and an accelerator pedal, in accordance with the present invention. A brake reaction force versus pedal travel curve 80 and an accelerator reaction force versus pedal travel curve 82 are shown representing characteristic pedal feel. The brake pedal travel curve 80 may be a non-linear function representing exponentially increasing reaction force with increasing pedal travel. The accelerator pedal travel curve 82 may be a linear function representing nominally increasing reaction force with increasing pedal travel. Brake pedals with a like reaction force versus pedal travel curve 80 may provide a desirable pedal feel consistent with conventional vacuum boosted apply systems. Those skilled in the art will recognize that the pedal feel emulator assemblies of the present invention are not limited to the exemplary pedal response curves. The inventor contemplates numerous other linear and non-linear reaction forces to pedal travel functions with respect to the present invention.

After the applied pedal force A has been estimated by the sensor 54, a signal based on the estimated force may be sent to a vehicle control system (not shown) via a wire or other means. The vehicle control system may be one or more systems for performing a vehicle function including, but not limited to, a brake-by-wire system, accelerator, parking brake, clutch, and the like. Typically, the vehicle control system, such as the brake-by-wire system, is activated in proportion to the applied pedal force A. In another embodiment, the sensor 54 may strictly sense the rotation, strain, and/or movement of various assembly 10, 10b components and relay this information to a micro-processing unit for estimating the applied pedal force A. The estimation may be achieved, for example, by using equations and/or lookup tables of material strain versus applied pedal force A for a given pedal feel emulator assembly 10, 10b. Compensation for factors such as material wear state and temperature, which may affect the applied pedal force A estimation, may be included in the equations and look-up tables.

While the embodiments of the invention disclosed herein are presently considered to be preferred, various changes and modifications can be made without departing from the spirit and scope of the invention. For example, the described pedal feel emulator assembly and method are not limited to any particular design or sequence. Specifically, the torsion bar 14, torque arm 50, reaction surface 52, 56, sensor 54, pedal pad 12, dynamic reaction force B and pedal travel characteristics, and other components and methods of using the same may vary without limiting the utility of the invention.

Upon reading the specification and reviewing the drawings hereof, it will become immediately obvious to those skilled in the art that myriad other embodiments of the present invention are possible, and that such embodiments are contemplated and fall within the scope of the presently claimed invention. The scope of the invention is indicated in the appended claims, and all changes that come within the meaning and range of equivalents are intended to be embraced therein.

What is claimed is:

1. A torsion pedal feel emulator assembly for a motor vehicle, the assembly comprising:
    a pedal member for receiving an applied pedal force;
    a torsion member operably attached to the pedal member, a portion of the torsion member positioned adjacent a reaction surface, wherein the torsion member rotates as a result of the applied pedal force, and a dynamic reaction force is generated against the applied pedal force; and
    a pivot operably attached to the torsion member and the motor vehicle.

2. The assembly of claim 1 wherein the applied pedal force is selected from a group consisting of a brake pedal force, an accelerator pedal force, a clutch pedal force, and a parking brake pedal force.

3. The assembly of claim 1 wherein the reaction surface comprises a linear surface.

4. The assembly of claim 3 wherein the dynamic reaction force comprises a linear reaction force to pedal travel characteristic.

5. The assembly of claim 1 wherein the reaction surface comprises a non-linear surface.

6. The assembly of claim 1 wherein the dynamic reaction force comprises a non-linear reaction force to pedal travel characteristic.

7. The assembly of claim 1 wherein the torsion member is manufactured from a resilient material.

8. The assembly of claim 1 further comprising a torsion member housing including an opening formed therein for receiving a portion of the torsion member, wherein the torsion member rotates with respect to the torsion member housing.

9. The assembly of claim 7 further comprising a bearing operably attached to the torsion member housing and the torsion member.

10. The assembly of claim 1 further comprising at least one sensor operably attached to the assembly for estimating the applied pedal force.

11. A method of operating a pedal feel emulator assembly for a motor vehicle, the method comprising:
    receiving an applied pedal force;
    rotating a torsion member as a result of the applied pedal force; and
    generating a dynamic reaction force against the applied pedal force as a result of the torsion member rotation.

12. The method of claim 11 wherein the applied pedal force is selected from a group consisting of a brake pedal force, an accelerator pedal force, a clutch pedal force, and a parking brake pedal force.

13. The method of claim 11 wherein generating the dynamic reaction force comprises generating a linear reaction force to pedal travel characteristic.

14. The method of claim 11 wherein generating the dynamic reaction force comprises generating a non-linear reaction force to pedal travel characteristic.

15. The method of claim 11 further comprising pivoting the torsion member with respect to the motor vehicle.

16. The method of claim 11 further comprising estimating the applied pedal force.

17. The method of claim 11 further comprising biasing a portion of the torsion member against a reaction surface.

18. A pedal feel emulator assembly for a motor vehicle, the assembly comprising:
    means for receiving an applied pedal force;
    means for rotating a torsion member as a result of the applied pedal force; and
    means for generating a dynamic reaction force against the applied pedal force as a result of the torsion member rotation.

* * * * *